United States Patent Office 3,472,752
Patented Oct. 14, 1969

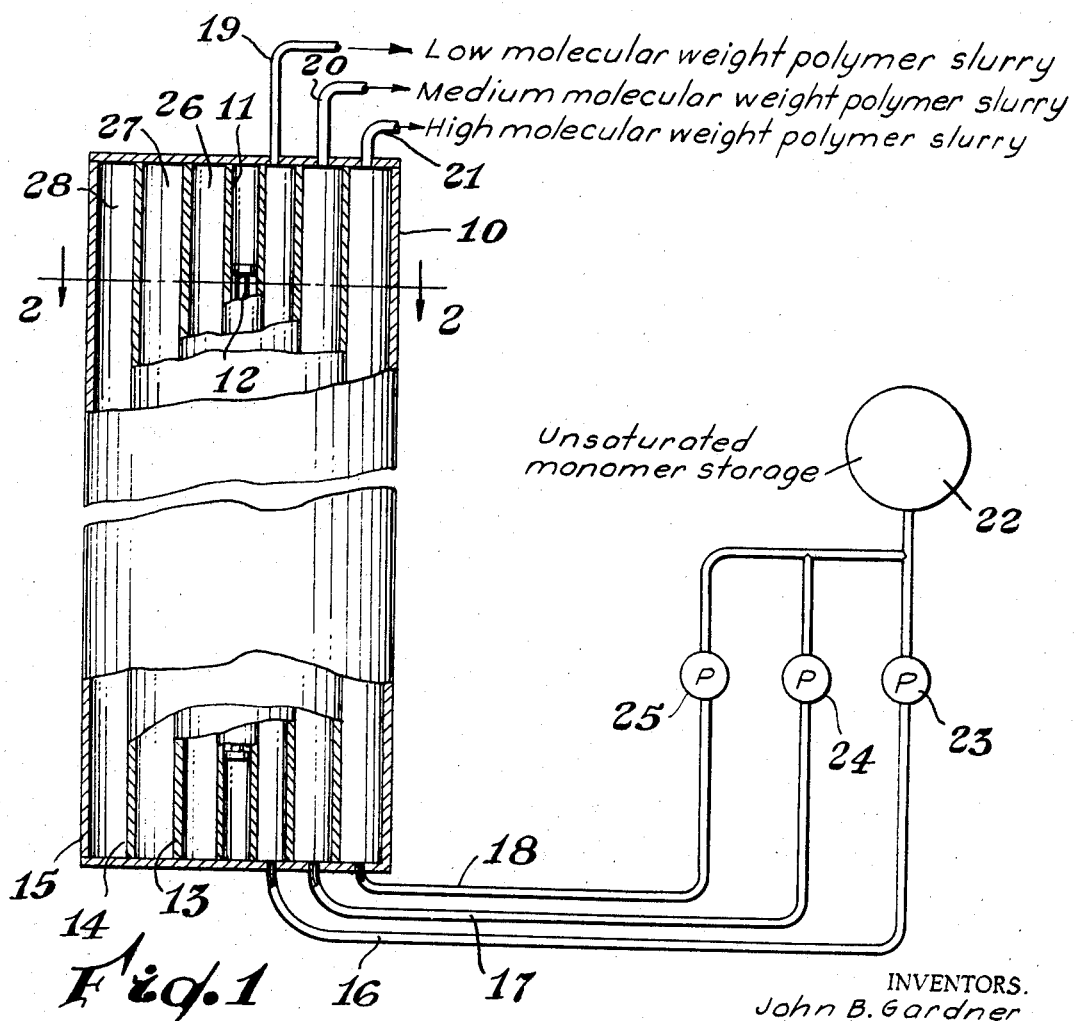

3,472,752
APPARATUS FOR THE PRODUCTION OF POLYMERS BY IRRADIATION
John B. Gardner, Lake Jackson, Tex., Charles F. Smith, Tulsa, Okla., and Billy G. Harper, Lake Jackson, Tex., assignors to The Dow Chemical Company, Midland, Mich., a corporation of Delaware
Original application Feb. 25, 1965, Ser. No. 435,299, now Patent No. 3,414,499. Divided and this application Nov. 13, 1967, Ser. No. 704,199
Int. Cl. B01k 1/00; C07c 3/24
U.S. Cl. 204—193                                   1 Claim

ABSTRACT OF THE DISCLOSURE

This invention relates to a reactor for the simultaeous polymerization of a plurality of polymerizable monomeric streams. Structurally the reactor has a central tubular core containing a high energy radiation source. Such core is surrounded by a plurality of concentric tubular reactor shells disposed outwardly from the central core and which form a plurality of reaction annuli around the central core. The reactor is likewise provided with means for introducing the polymerizable material into each of the reaction annuli and means for removing the polymerized product therefrom.

---

This is a division of application Ser. No. 435,299, filed Feb. 25, 1965, now Patent No. 3,414,499.

This invention relates to an apparatus and process for the irradiation polymerization of unsaturated compounds and more particularly relates to an apparatus and process whereby polymers of different average molecular weight may be simultaneously yet separately produced by the action of ionizing radiation.

The polymerization of unsaturated compounds by ionizing radiation is well known. It is likewise well known that the mechanism of polymerization involves the formation of free radicals on the unsaturated compound by application of high energy particles thereto with a subsequent joining of the molecules to form more or less linear polymers. Average molecular weight is a function of intensity so it is important that the intensity of the radiation reaching the monomer be controlled. High intensity produces low molecular weight polymer and low intensity produces high molecular weight polymers. If irradiation is continued after an apprecibale amount of polymer has been formed, often additional free radical sites will form on the polymer chain and cross-linked and branched-chain polymers are produced. According to the methods now known and employed, therefore, the polymers produced by radiation techniques usually require a number of different reactors to produce polymer species having various molecular weights and degrees of crosslinking. These procedures do not efficiently use the available radiation but rather utilize only a narrow intensity range in any given reactor.

It is highly desirable for purposes of end use and fabrication that polymers having different average molecular weights be available. In order to supply this need, the typical radiation-produced polymer is fractionated into different molecular weight fractions. However, the fractionation is not only a time consuming and expensive operation but often tends to degrade the polymer and otherwise alter the group of polymer species being separated.

It is an object of this invention, therefore, to provide an apparatus and a process whereby polymerizable unsaturated monomeric materials can be polymerized by the action of ionizing radiation to produce polymers having different average molecular weights. It is a further object of this invention to provide an apparatus and process for simultaneously producing two or more polymers each having different average molecular weights.

A further object of this invention is to effectively utilize all radiation of both high and low intensity.

Other objects and advantages of the process will become apparent from a reading of the following portions of the specification and claim.

It has now been discovered that polymers having different average molecular weights may be produced by providing a source of ionizing radiation axially located at the center of two or more concentric pipes, and passing one or more unsaturated monomers through the annular spaces provided by the concentric pipes. The resulting polymeric product or products may then be separately collected and utilized without the necessity of fractionation.

The accompanying drawing illustrates the invention embodied in a preferred form, it being understood that the form of the invention is susceptible of modification without departure from the true spirit and scope thereof.

FIGURE 1 is a side elevation, largely in section, of the reactor showing a scheme of delivery thereto of multiple streams of unsaturated monomer from a single source.

FIGURE 2 is a sectional plan view of the reactor at section 2—2.

Referring to the drawings (in which like numbers are used to denote like parts) there is shown, in FIGURE 1, a reactor 10 composed of a central tube or core 11 which contains a $Co^{60}$ rod 12 as the radiation source. This central tube or core 11 is surrounded by concentric reactor tubes of ever increasing diameter. The first such concentric reactor tube 13 is closest to the radiation source, reactor tube 14 is more distant and reactor tube 15 is the most distant from the irradiation source. Unsaturated monomer storage tank 22 is shown connected to individual pumps 23, 24, and 25 which supply the annular spaces 26, 27, and 28 through lines 16, 17 and 18. In the upper portion of reactor 10 are product outlet lines 19, 20 and 21. It is to be understood that if different monomers are used, a different storage tank would normally supply each of the individual pumps.

FIGURE 2 is a plan section taken at plane 2—2 through FIGURE 1 and shows the core 11 with a $Co^{60}$ rod 12 in the central portion thereof. Concentrically around this central core 11 are placed product tubes 13, 14 and 15 forming annular reaction spaces 26, 27 and 28, respectively.

According to the process of this invention, polymerizable unsaturated organic monomer such as vinyl chloride is fed to one or more of the annuli of the reactor. Several streams of the same monomer may be fed to the different annuli to produce polymers of various molecular weights, or several different monomers may be fed each to its own annulus to produce several types of polymers simultaneously. As is well known, the radiation intensity will vary with distance from the source so virtually any molecular weight of polymer may be obtained by supplying the proper monomer to the portion of the reactor which is the necessary distance from the radiation source. It is likewise well known that high intensity radiation produces low molecular weight polymers whereas low intensity radiation produces high molecular weight polymers. As is shown by FIGURE 1 of the drawing, vinyl chloride may be fed to three different annuli of the reactor to produce three different polymer species. That monomer fed to the annulus closest to the radiation source produces a relatively low molecular weight product whereas the most distant annulus produces a relatively high molecular weight product. In this process, however, no product separation is necessary since all monomer streams are already separate and the polymer from each stream may simply be removed from unreacted monomer and utilized without the usual processing.

While the reactor may be constructed of any suitable non-reactive, material unaffected by radiation, experience has shown stainless steel and titanium to be particularly suitable. While wall thickness of the individual concentric tubes is not critical, this is determined by optimizing strength and permeability factors for each reactor. The walls must be sufficiently heavy to be structurally strong but sufficiently thin so as to not absorb too much radiation, particularly if a large number of concentric tubes are to be employed. In general, the inner tube or two may be thinner than the outer tubes. An inner tube thickness of from about 1 mm. to about 10 mm. and an outer tube thickness of from 1.5 or 2.0 to 15 mm. is generally useful for stainless steel. If titanium is employed, the wall thickness need be only ⅓ to ½ this amount.

The size of the annular spaces between the concentric pipes or tubes may be varied depending on the desired results. More closely spaced tubes leaving very thin annular spaces will produce polymer having a more narrow molecular weight spread than will the more widely spaced tubes.

Total dose is easily controlled in this process by simply increasing or decreasing the residence time of the unsaturated monomer and polymer within the reactor. Residence time may also be easily controlled over a wide range by changing the flow rate of the monomer or by changing the annular distance or both. The total dose necessary to form polymer of a given type will vary depending on the monomer, but these values are available in the published literature and are well known to those knowledgeable in this field.

Monomeric unsaturated compounds may be fed into either the top or bottom of the reactor, may be in either liquid, gaseous or even solid form and may be present in bulk or as solutions or emulsions in relatively inert solvents or carriers. Likewise, the process may be easily used either as a batch or continuous process.

Any monomeric unsaturated compound which will polymerize in the presence of ionizing radiation may be employed in the process of this invention but the vinyl compounds are particularly useful. Typical monomers include vinyl chloride, ethyl acrylate, methyl methacrylate, ethylene, acrylic acid, allyl chloride, allyl alcohol, vinyl morpholinone, acrylamide. Copolymers, terpolymers, polysulfones, etc. may also be prepared by passing mixtures of monomers through the reactor. Any of the well-known mixtures of liquid polymerizable vinylidene compounds heretofore used for the production of copolymers can be employed in producing copolymers by the method of the present invention.

Any ionizing radiation source may be used in this process so long as it is capable of free radical production in unsaturated compounds and is physically capable of emitting high energy particles radially from a central source. A material which can be formed into a rod is particularly desirable but even a point source of radiation is useful herein. Materials such as radium, $Cs^{137}$, $Sr^{90}$, $La^{133}$, $Co^{60}$, $In^{115}$, $I^{129}$, $Ba^{133}$, $Pb^{210}$, and $Bi^{207}$ may be used.

EXAMPLE 1

A reactor as shown in FIGURE 1 was used in continuously and simultaneously produce vinyl chloride polymers having three different everage molecular weights. The hollow core had a radius of 10 cm. and a wall thickness of 7 mm., while the outer concentric tubes were each of a wall thickness of 10 mm. and had radii of 50 cm., 90 cm. and 130 cm., respectively. The reactor was 700 cm. long and was operated at ambient conditions of temperature and pressure. Monomeric vinyl chloride was fed to each of the annuli at the rate shown. In the following table, results of this experiment are given together with the intensity of the radiation to which the vinyl chloride was subjected.

TABLE I

| | | | |
|---|---|---|---|
| Radius, cm. | 50 | 90 | 130 |
| Volume of annulus, cc. | $5.3 \times 10^6$ | $12.3 \times 10^6$ | $19.2 \times 10^6$ |
| Weight of vinyl chloride fed, lbs./hr. | 60,000 | 28,000 | 9,000 |
| Av. Intensity mr./hr. | 1.2 | 0.125 | 0.013 |
| Percent Conv./hr. | 55 | 10 | 2 |
| Wt. PVC/hr. (lbs.) | 5,500 | 2,360 | 725 |
| Av. M.W. | 14,000 | 150,000 | 850,000 |

EXAMPLE 2

Following the same general procedure of Example 1 and using the same equipment, polymethylmethacrylate polymers were prepared which had three different average molecular weights. In order to produce a greater variation in dose rate between the various annular spaces, additional shield tubes composed of about 3 mm. stainless steel were inserted. Fifty grams of distilled methylmethacrylate were purged with nitrogen, divided into three different equal portions and one portion was placed in each of the reactor annular spaces. Each portion of the monomer was irradiated by the $Co^{60}$ source until it had received a total dose of 0.25 megarad. At this time, the polymer was removed from the reactor, dissolved in acetone, precipitated with methyl alcohol and dried in an oven. A weighed sample of the dried material in cyclohexanone was then used to determine the intrinsic viscosity of the polymer which is a function of the polymer's molecular weight. The following table summarizes the results obtained.

TABLE II

| Megarad/hr. dose rate | Shield tubes between sample and source | Molecular weight by viscosity |
|---|---|---|
| 0.25 | 0 | $3.44 \times 10^4$ |
| 0.15 | 2 | $6.24 \times 10^4$ |
| 0.09 | 4 | $8.10 \times 10^4$ |

In a like manner, other radiation polymerizable materials such as acrylic acid, acrylamides, acrylic esters, vinyl-vinylidene copolymers and vinyl carboxylates may be likewise polymerized in mass polymerizations as illustrated above or as suspensions, solutions or emulsions.

We claim:
1. A reactor for the simultaneous polymerization of polymerizable unsaturated monomeric materials which comprises a central tubular core, a high energy radiation source contained within said core, a plurality of concentric tubular reactor shells outward from said central tubular core which form a plurality of reaction annuli outward from said central tubular core, means for introducing a polymerizable unsaturated monomeric material into each such reaction annulus and separate means for removing the polymerized product therefrom.

References Cited

UNITED STATES PATENTS 3,072,548   1/1963   Lucchesi et al. _____ 204—162

HOWARD S. WILLIAMS, Primary Examiner